United States Patent
Hwang

(10) Patent No.: US 11,709,335 B2
(45) Date of Patent: Jul. 25, 2023

(54) CAMERA MODULE INCLUDING POSITION SENSOR

(71) Applicant: Samsung Electronics Co., Ltd., Gyeonggi-do (KR)

(72) Inventor: Youngjae Hwang, Gyeonggi-do (KR)

(73) Assignee: Samsung Electronics Co., Ltd

( * ) Notice: Subject to any disclaimer, the term of this patent is extended or adjusted under 35 U.S.C. 154(b) by 334 days.

(21) Appl. No.: 17/071,367

(22) Filed: Oct. 15, 2020

(65) Prior Publication Data

US 2021/0116673 A1 Apr. 22, 2021

(30) Foreign Application Priority Data

Oct. 16, 2019 (KR) .................. 10-2019-0128524

(51) Int. Cl.
*G02B 7/00* (2021.01)
*G03B 3/10* (2021.01)
(Continued)

(52) U.S. Cl.
CPC ............... *G02B 7/09* (2013.01); *G03B 3/10* (2013.01); *H04N 23/54* (2023.01); *G03B 2205/0069* (2013.01); *H04N 23/57* (2023.01)

(58) Field of Classification Search
CPC ............ G03B 5/00; G03B 5/04; G03B 13/36; G03B 3/10; G03B 3/12; G03B 2205/0007; G03B 2205/0053; G03B 2205/0015; G03B 2205/0069; G03B 3/02; G03B 13/34; G03B 30/00; G02B 7/021; G02B 7/04;
(Continued)

(56) References Cited

U.S. PATENT DOCUMENTS 8,861,946 B2 10/2014 Kim et al.
9,013,588 B2 4/2015 Moriya et al.
(Continued)

FOREIGN PATENT DOCUMENTS

KR 1020120045333 5/2012
KR 1020140144126 12/2014

OTHER PUBLICATIONS

International Search Report dated Feb. 9, 2021 issued in counterpart application No. PCT/KR2020/013963, 10 pages.
(Continued)

*Primary Examiner* — Marin Pichler
(74) *Attorney, Agent, or Firm* — The Farrell Law Firm, P.C.

(57) ABSTRACT

A camera module includes a housing assembly, a driving assembly received in the housing assembly, and a lens assembly received in the driving assembly and including at least one lens aligned in a first direction. The driving assembly includes a first magnetic member fixed to one side surface of the driving assembly and driven in the first direction. The housing assembly includes a first coil disposed to face the first magnetic member and configured to generate a magnetic field in response to a first signal to drive the first magnetic member and a first position sensor disposed at one side of the first coil and configured to measure a position of the first magnetic member. The first position sensor is disposed to be partially overlapped with a first virtual expansion area formed by expanding the first magnetic member in a direction that uniformly maintains spacing from the first coil.

18 Claims, 12 Drawing Sheets

(51) Int. Cl.
*H04N 5/225* (2006.01)
*G02B 7/09* (2021.01)
*H04N 23/54* (2023.01)
*H04N 23/57* (2023.01)

(58) Field of Classification Search
CPC .............. G02B 7/08; G02B 7/09; G02B 7/10;
G02B 9/62; G02B 13/001; G02B
13/0065; G02B 27/646; H04N 5/2253;
H04N 5/2254; H04N 5/2257; H04N
5/23287; H02K 11/33; H02K 41/0356
USPC ....... 359/911, 554, 555, 557, 811, 813, 814,
359/823, 824, 872, 877
See application file for complete search history.

(56) References Cited

U.S. PATENT DOCUMENTS

| | | | |
|---|---|---|---|
| 9,134,587 B2 | 9/2015 | Lim et al. | |
| 9,438,801 B2 | 9/2016 | Hwang et al. | |
| 9,684,184 B2 | 6/2017 | Miller et al. | |
| 9,832,383 B2 | 11/2017 | Hwang et al. | |
| 10,075,641 B2 | 9/2018 | Moriya et al. | |
| 10,097,760 B2 | 10/2018 | Moriya et al. | |
| 10,386,651 B2 | 8/2019 | Kim et al. | |
| 10,678,062 B2 | 6/2020 | Im et al. | |
| 2014/0362284 A1 | 12/2014 | Shin et al. | |
| 2015/0378169 A1 | 12/2015 | Kim et al. | |
| 2016/0004091 A1 | 1/2016 | Lim et al. | |
| 2016/0070115 A1 | 3/2016 | Miller et al. | |
| 2016/0327806 A1 | 11/2016 | Kasamatsu | |
| 2017/0139225 A1* | 5/2017 | Lim | G02B 7/08 |
| 2017/0160558 A1* | 6/2017 | Kim | H02K 1/34 |
| 2018/0224665 A1 | 8/2018 | Im et al. | |
| 2019/0124265 A1* | 4/2019 | Lee | G02B 7/08 |
| 2020/0257132 A1 | 8/2020 | Im et al. | |

OTHER PUBLICATIONS

European Search Report dated Sep. 20, 2022 issued in counterpart application No. 20877647.6-1208, 9 pages.

* cited by examiner

<501>

<502>

<601>

<602>

CAMERA MODULE INCLUDING POSITION SENSOR

CROSS-REFERENCE TO RELATED APPLICATION(S)

This application is based on and claims priority under 35 U.S.C. § 119 to Korean Patent Application No. 10-2019-0128524, filed on Oct. 16, 2019, in the Korean Intellectual Property Office, the disclosure of which is incorporated by reference herein its entirety.

BACKGROUND

1. Field

The present disclosure relates generally to a camera module of an electronic device.

2. Description of Related Art

Recently, various types of portable electronic devices, such as a smartphone, and a tablet personal computer (PC), have been widely spread, with the development of an information technology.

The electronic devices include a camera module. The camera module may be implemented in compact size to be embedded in the electronic device and may include various functions. The camera module may include a zoom function to enlarge or reduce a captured target at various magnifications. The camera module may have an auto-focus function. In addition, the camera module may include an optical image stabilizer (OIS) function (e.g., vibration reduction).

The portable electronic device is limited in size and thickness in consideration of portability, and even the camera module included in the portable electronic device is limited in size and thickness. The camera module may include a magnetic member and a coil such that the auto focus (AF) function and the OIS function are implemented. In addition, the camera module may include a position sensor (e.g., a Hall sensor) to sense the position of the magnetic member. In a conventional camera module, the position sensor is placed at a position to measure the maximum magnetic force of the magnetic member. Although the size of the coil is able to be reduced, the size of the coil is determined depending on the size of the position sensor, thereby making it difficult to reduce the size of the camera module.

SUMMARY

The present disclosure has been made to address at least the disadvantages described above and to provide at least the advantages described below In accordance with an aspect of the present disclosure, a camera module is provided. The camera module includes a housing assembly, a driving assembly received in the housing assembly, and a lens assembly received in the driving assembly and including at least one lens aligned in a first direction. The driving assembly includes a first magnetic member fixed to one side surface of the driving assembly and driven in the first direction. The housing assembly includes a first coil disposed to face the first magnetic member and configured to generate a magnetic field in response to a first signal to drive the first magnetic member and a first position sensor disposed at one side of the first coil and configured to measure a position of the first magnetic member. The first position sensor is disposed to be partially overlapped with a first virtual expansion area formed by expanding the first magnetic member in a direction that uniformly maintains spacing from the first coil.

In accordance with an aspect of the present disclosure, a camera module is provided. The camera module includes a housing assembly, a driving assembly received in the housing assembly, and a lens assembly received in the driving assembly and including at least one lens. The driving assembly includes at least one magnetic member fixed to one side surface of the driving assembly and moving in at least one direction. The housing assembly includes a coil disposed to face the magnetic member and a position sensor disposed at one side of the coil and configured to measure an intensity of a magnetic field from the magnetic member. The position sensor is disposed to be partially overlapped with a virtual expansion area formed by expanding the magnetic member in a direction that uniformly maintains a specific spacing from the coil.

BRIEF DESCRIPTION OF THE DRAWINGS

The above and other aspects, features and advantages of certain embodiments of the disclosure will be more apparent from the following detailed description taken in conjunction with the accompanying drawings, in which.

DETAILED DESCRIPTION

Hereinafter, various embodiments of the disclosure may be described with reference to accompanying drawings. Accordingly, those of ordinary skill in the art will recognize that modification, equivalent, and/or alternative on the various embodiments described herein can be variously made without departing from the scope and spirit of the disclosure.

Figure 1:
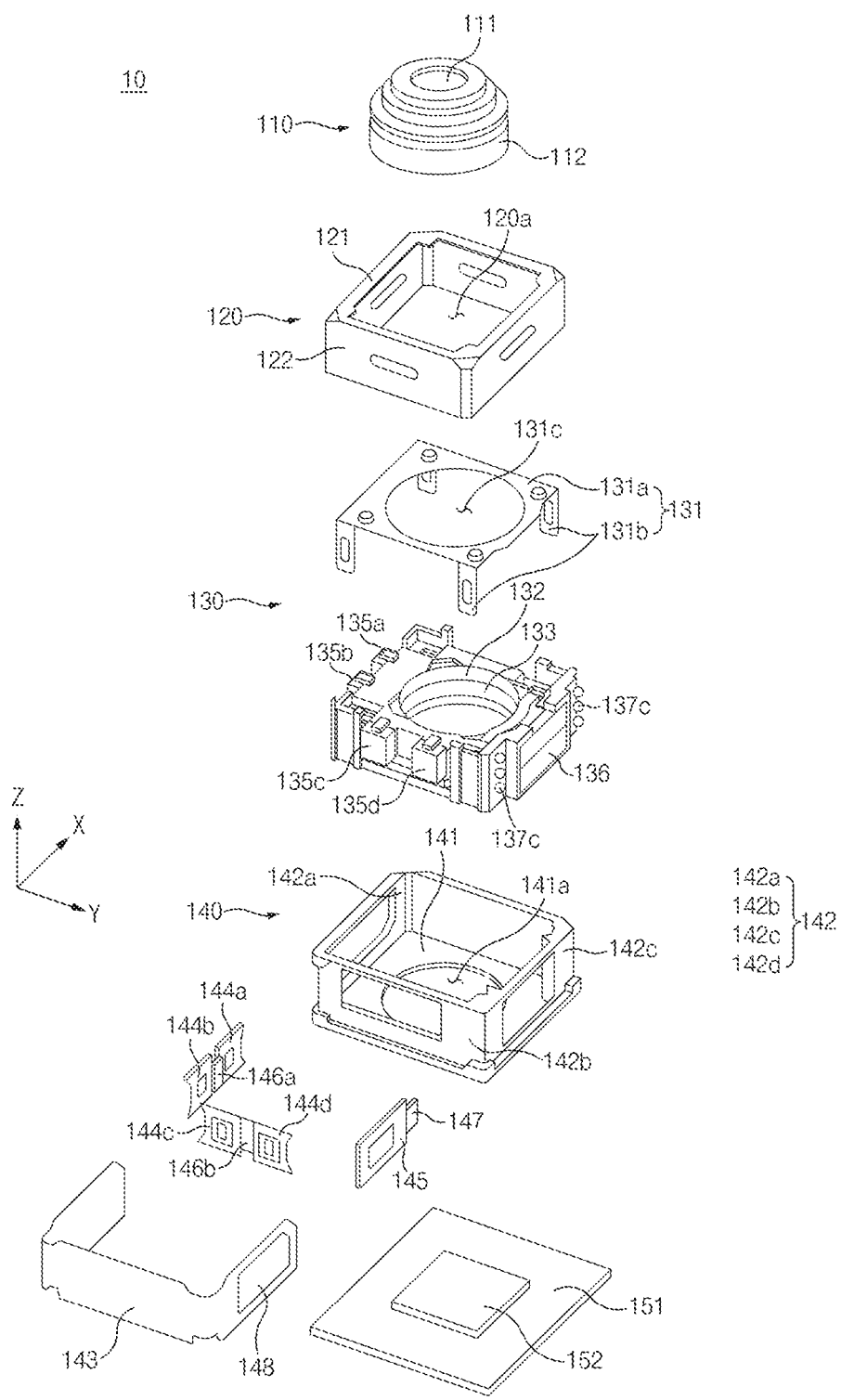
FIG. 1 is an exploded perspective view of a camera module, according to an embodiment.
Figure 2A:
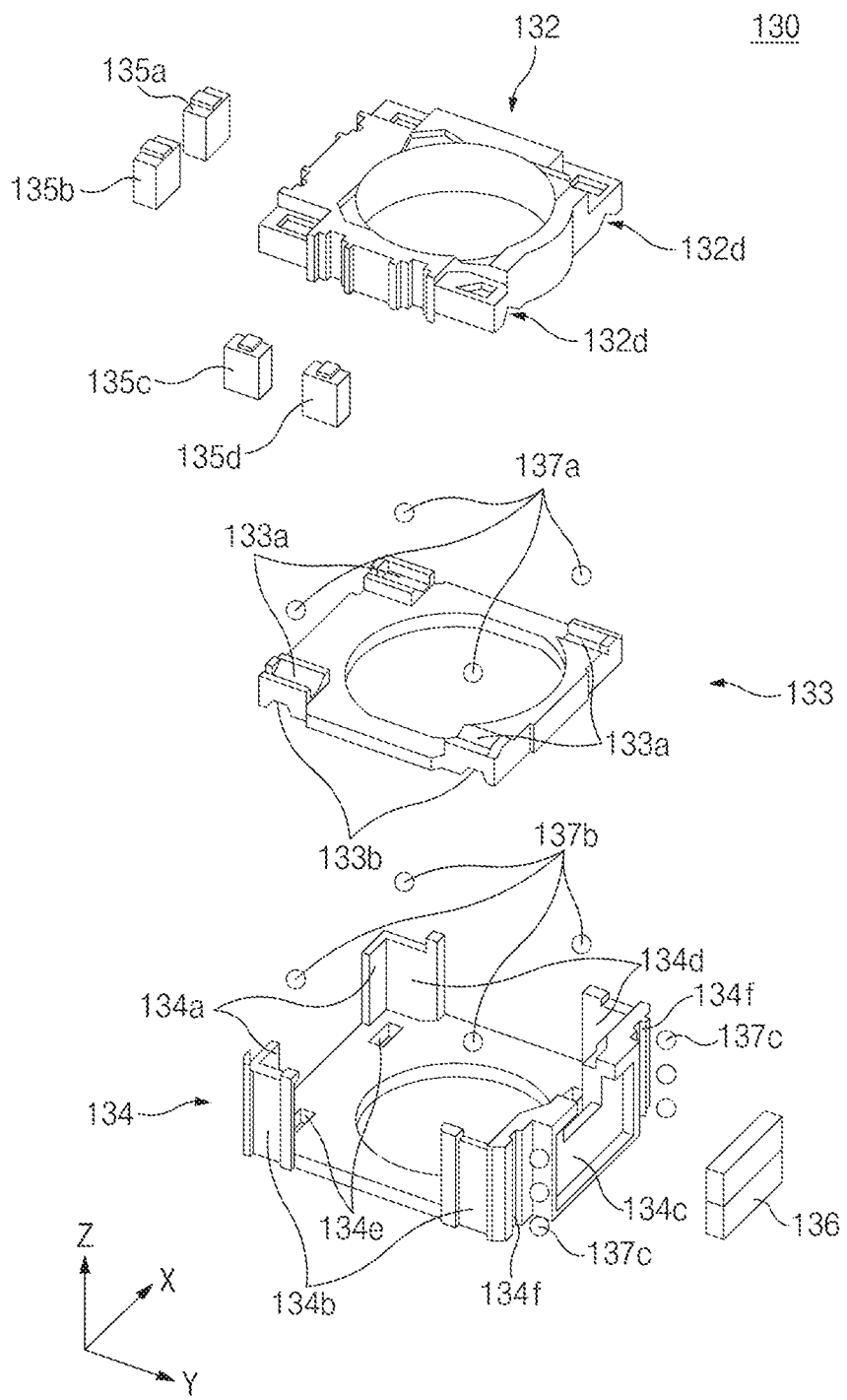
FIG. 2A is an exploded perspective view illustrating a driving assembly when viewed from one direction, according to an embodiment.
Figure 2B:
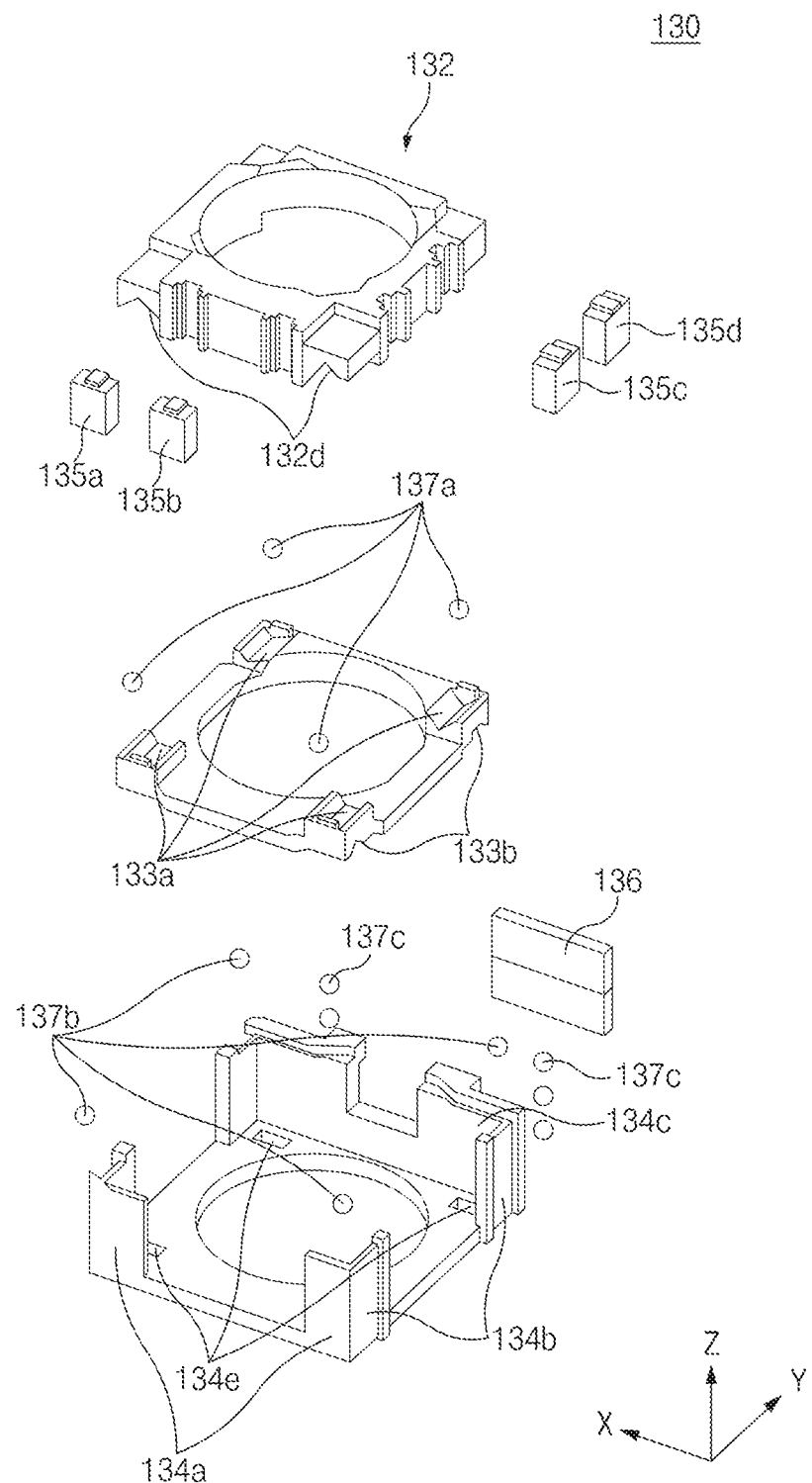
FIG. 2B is an exploded perspective view illustrating a driving assembly when viewed from a direction different from the direction of FIG. 2A, according to an embodiment.
Figure 3A:
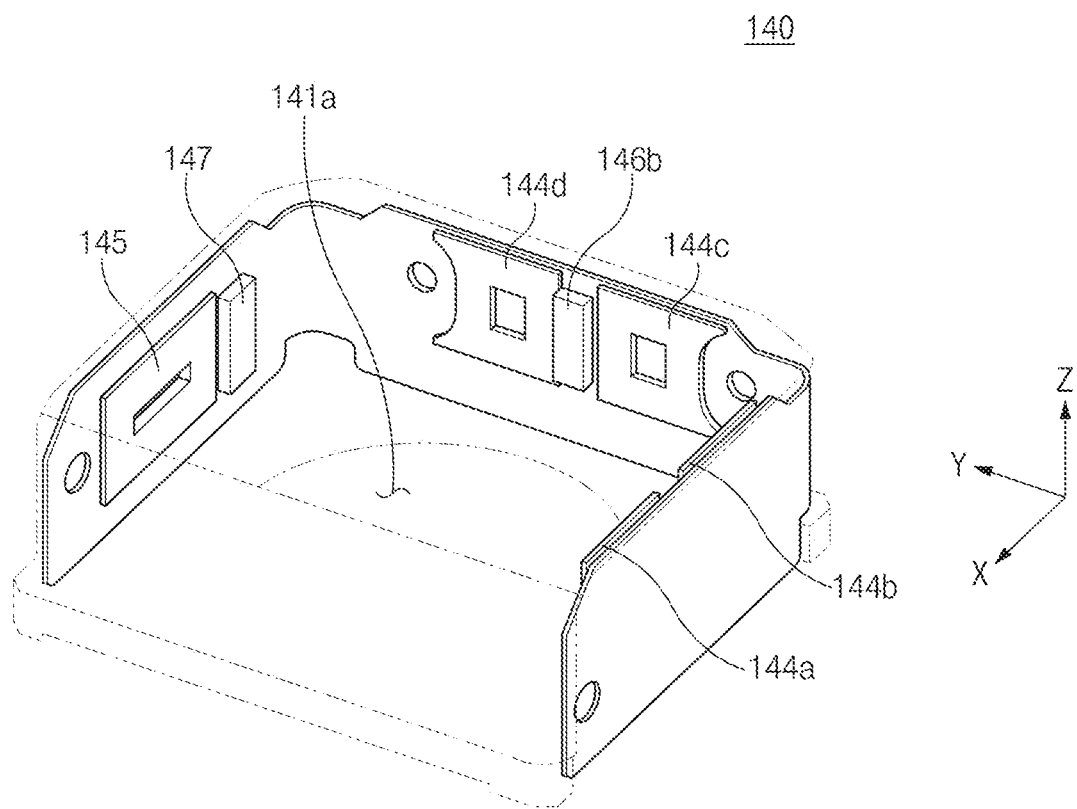
FIG. 3A is an exploded perspective view illustrating a housing assembly when viewed from one direction, according to an embodiment.
Figure 3B:
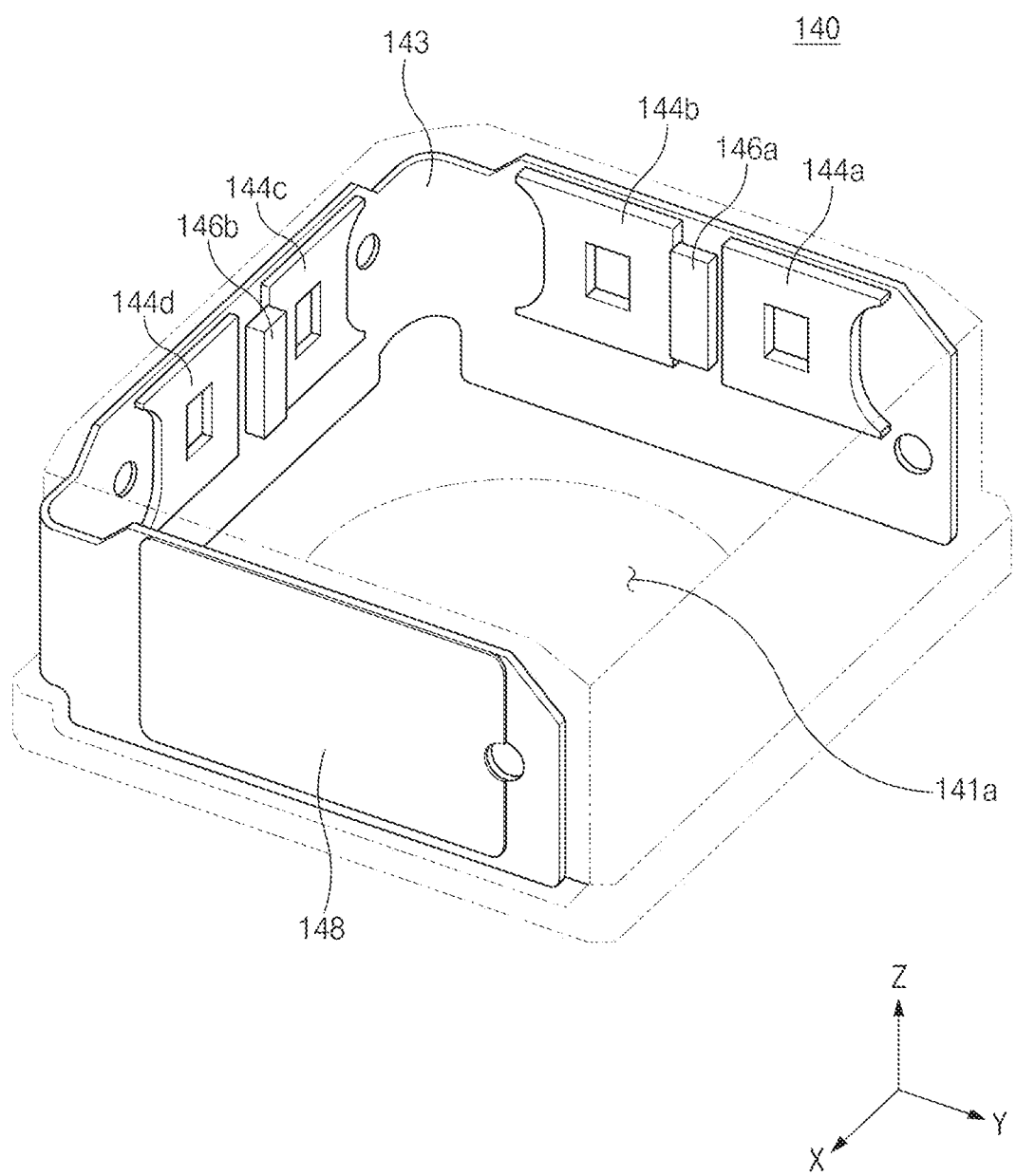
FIG. 3B is an exploded perspective view illustrating a housing assembly when viewed from a direction different from the direction of FIG. 3A, according to an embodiment.
Figure 3C:
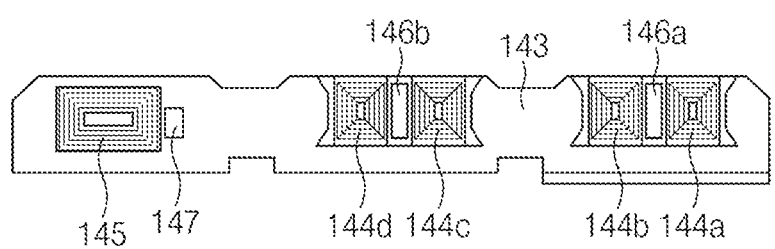
FIG. 3C is a view illustrating a printed circuit board (PCB), a coil, and a position sensor, according to an embodiment.
Figure 4:
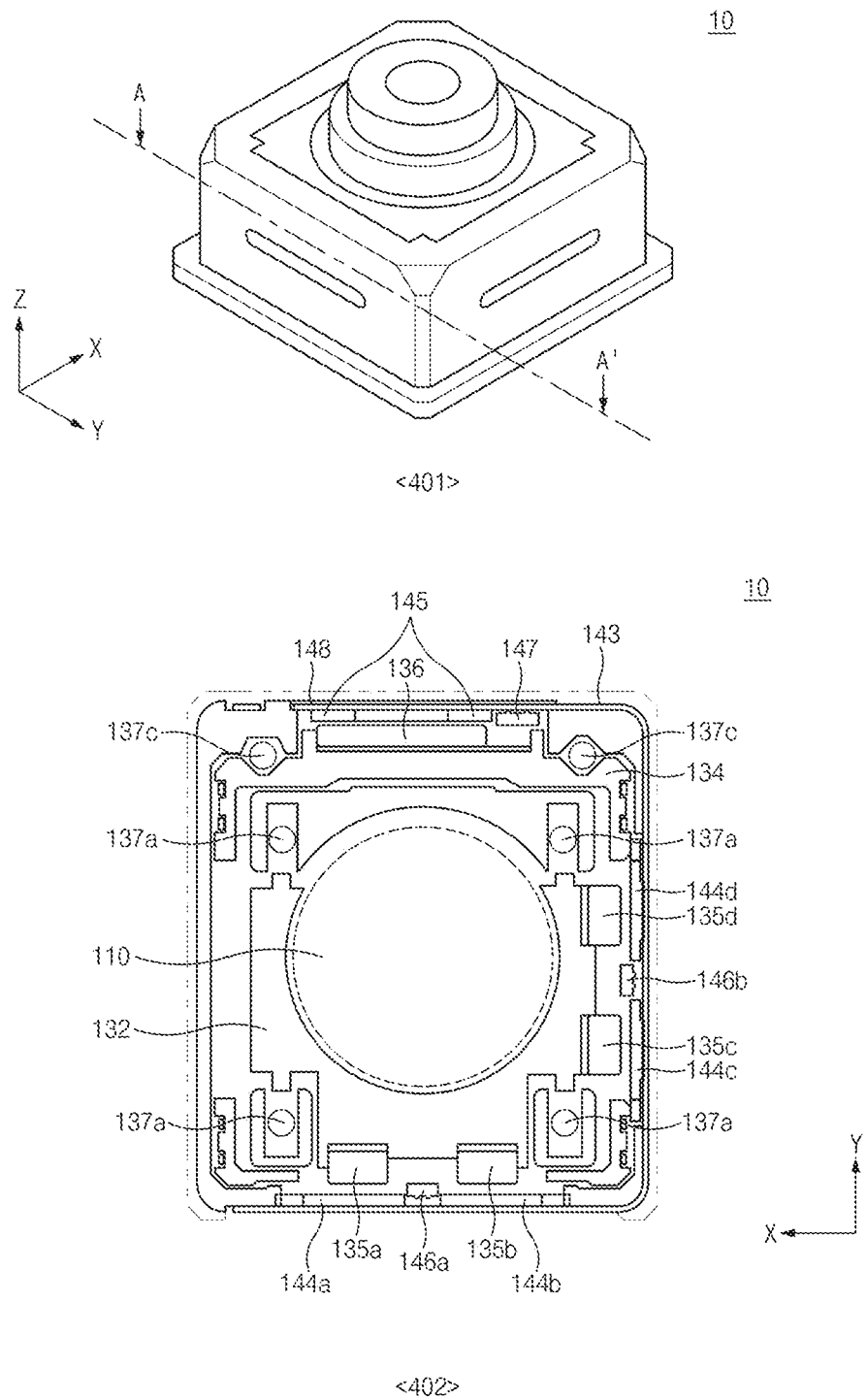
FIG. 4 is a sectional view taken along line A-A' of a camera module, according to an embodiment.

FIG. 1 is an exploded perspective view of a camera module, according to an embodiment. FIG. 2A is an exploded perspective view illustrating a driving assembly when viewed from one direction, according to an embodiment. FIG. 2B is an exploded perspective view illustrating a driving assembly when viewed from a direction different from the direction of FIG. 2A, according to an embodiment. FIG. 3A is an exploded perspective view illustrating a housing assembly when viewed from one direction, according to an embodiment. FIG. 3B is an exploded perspective view illustrating a housing assembly when viewed from a direction different from the direction of FIG. 3A, according to an embodiment. FIG. 3C is a view illustrating a PCB, a coil, and a position sensor, according to an embodiment. FIG. 4 is a sectional view taken along line A-A' of a camera module, according to an embodiment.

Referring to FIGS. 1 to 4, a camera module 10 may include a lens assembly 110, and a lens driving unit or an actuator structure (e.g., a driving assembly 130 and a housing assembly 140). Alternatively, the camera module 10 may include the lens assembly 110, a shield can 120, and the actuator structure.

The lens assembly 110 may include a lens 111 and a lens barrel 112. The lens 111 may collect light incident from the outside and transmit the light to an image sensor 152 disposed under the lens barrel 112. The lens 111 may include one lens or a plurality of lenses. The lens 111 may be fixed to one side of the lens barrel 112. The lens barrel 112 may surround the lens 111 seated thereon and may provide an optical path to transmit light, which is incident through the lens 111, to the image sensor 152. In this regard, the central portion of the lens barrel 112 may be empty, and the lower portion of the lens barrel 112 may be open to expose the image sensor 152. An upper portion of the lens barrel 112 may be provided in the shape corresponding to the shape of the lens 111. The lens barrel 112 may be seated and fixed inside the driving assembly 130. Accordingly, as the driving assembly 130 moves, the lens assembly 110 (or the lens barrel 112 and the lens 111) may move.

The shield can 120 may be provided substantially in the shape to cover the camera module 10 downward from the top. The shield can 120 may include a top surface 121, shield can sidewalls 122 disposed at edges of the top surface 121, and a bottom surface which is open. A shield can hole 120a having a specific size may be defined in the top surface 121 of the shield can 120 to expose at least a portion of the lens 111. The shield can sidewall 122 is coupled to an edge of the housing assembly (or housing) 140 of the camera module 10 to protect or fix components (e.g., the lens assembly 110, the driving assembly 130, and the housing assembly 140) seated therein. The shield can 120 may be formed of a metal material or a material (e.g., a metal material or tempered plastic) having hardness having a specific size or more.

The driving assembly 130 may include a first carrier 132 (e.g., an OIS carrier) and a second carrier 134 (e.g., an AF carrier). The first carrier 132 may be provided to be empty therein such that the lens barrel 112 is disposed therein. A first magnetic member 135a, a second magnetic member 135b, a third magnetic member 135c, and a fourth magnetic member 135d (e.g., the OIS magnetic member) may be disposed on at least two outer portions of the first carrier 132. The first magnetic member 135a and the second magnetic member 135b may be disposed on one outer portion of the first carrier 132. The third magnetic member 135c and the fourth magnetic member 135d may be disposed on another outer portion of the first carrier 132. The at least two outer portions may share a corner.

The driving assembly 130 may include a cover 131 (or the OIS cover). The cover 131 may be provided in the shape to cover the driving assembly 130 downward from the top. The cover 131 may prevent the first carrier 132 from deviating from the second carrier 134. In this regard, the cover 131 may include an upper board 131a and leads 131b. The upper board 131a, which has the shape of a cylindrical band or a polygonal band (e.g., a rectangular band) hollowed at the central portion thereof, may include a cover hole 131c provided in a specific size at the central portion thereof such that at least a portion of the lens 111 is exposed. The leads 131b may be formed with a specific length and a specific width while extending right downward from one side (e.g., a corner area) of the upper board 131a. The leads 131b may be provided in the shape of a band which is hollowed, and may be coupled to one side of the second carrier 134.

The first carrier 132 may be seated on the central portion of the second carrier 134. The first carrier 132 may move in an X-axis or Y-axis direction inside the second carrier 134. The second carrier 134 may include one or more sidewalls 134a, 134b, 134c, and 134d. The second carrier 134 may include the first carrier sidewall 134a formed to expose the first magnetic member 135a and the second magnetic member 135b operating such that the first carrier 132 having the lens barrel 112 seated thereon moves in the X-axis direction, and the second carrier sidewall 134b formed to expose the third magnetic member 135c and the fourth magnetic member 135d operating such that the first carrier 132 having the lens barrel 112 seated thereon moves in the Y-axis direction. Alternatively, the second carrier 134 may include the third carrier sidewall 134c provided at the outside thereof with an AF magnetic member 136 used to move the lens assembly 110 in a Z-axis direction. Alternatively, the second carrier 134 may include the fourth carrier sidewall 134d.

The first magnetic member 135a, the second magnetic member 135b, the third magnetic member 135c, and the fourth magnetic member 135d for the OIS may each be used in pair with coils (e.g., a first coil 144a, a second coil 144b, a third coil 144c, and a fourth coil 144d) disposed in the housing assembly 140 and associated with the OIS. The first magnetic member 135a, and the second magnetic member 135b may be used to move the first carrier 132 having the lens barrel 112 fixed thereto in the X-axis direction (or one direction of a horizontal axis when an upper direction, in which the shield can 120 is disposed, is defined as a vertical axis). The third magnetic member 135c, and the fourth magnetic member 135d may be used to move the first carrier 132 having the lens barrel 112 fixed thereto in the Y-axis direction (or another direction of the horizontal axis when the upper direction in which the shield can 120 is disposed is defined as the vertical axis).

As position sensors 146a, 146b, and 147 are disposed at one sides of coils 144a, 144b, 144c, 144d, and 145 or between two adjacent coils of the coils 144a, 144b, 144c, 144d, and 145, the thicknesses of the coils 144a, 144b, 144c, 144d, and 145 may be formed to be less than those of the position sensors 146a, 146b, and 147. The thicknesses of the first coil 144a and the second coil 144b may be formed to be less than the thickness of the first position sensor 146a. The thicknesses of the third coil 144c and the fourth coil 144d may be formed to be less than the thickness of the second position sensor 146b. The thickness of the AF coil 145 may be formed to be less than the thickness of the AF position sensor 147. According to various embodiments, the coils 144a, 144b, 144c, 144d, and 145 disposed in the housing assembly 140 may include a fine pattern coil.

The driving assembly 130 may include a guide member 133 and guide balls 137a and 137b to guide and support the movement of the first carrier 132. The first guide balls 137a may be interposed between the first carrier 132 and the guide member 133. The first carrier 132 may reciprocate in the X-axis direction (or Y-axis direction) through the first guide balls 137a. The second guide balls 137b may be interposed between the guide member 133 and the second carrier 134. The guide member 133 may reciprocate in the Y-axis direction (or the X-axis direction) through the second guide balls 137b, so the first carrier 132 may reciprocate in the Y-axis direction (or the X-axis direction). The first carrier 132, the guide member 133, and the second carrier 134 may have guide grooves 132d, 133a, 133b, and 134e formed therein to receive the guide balls 137a and 137b. The guide grooves 132d, 133a, 133b, and 134e extend in a specified direction (e.g., the X-axis direction or the Y-axis direction) and may have V-shaped sectional surfaces. The guide grooves 132d, 133a, 133b, and 134e may restrict the first carrier 132 from moving in a direction other than the specified direction (e.g., the X-axis direction or the Y-axis direction). When the first carrier 132 reciprocates in the X-axis direction or the Y-axis direction, the guide balls 137a and 137b may perform rolling in the guide grooves 132d, 133a, 133b, and 134e.

AF guide grooves 134f and AF guide balls 137c may be provided in at least one sidewall (e.g., the third carrier sidewall 134c) of the second carrier 134 to guide and support the movement of the second carrier 134. The AF guide grooves 134f may restrict the second carrier 134 from moving in a specified direction (e.g., the Z-axis direction) in the housing assembly 140. The AF guide grooves 134f may extend in the specified direction (e.g., a Z-axis direction), and may have a V-shaped sectional surfaces. When the second carrier 134 reciprocates in the specified direction (e.g., in the Z-axis direction), the AF guide balls 137c may perform rolling in the AF guide grooves 134f.

The housing assembly 140 may include a seating part 141, on which the above-components (e.g., the lens assembly 110 and the driving assembly 130) are seated, and housing sidewalls 142 disposed to surround the above-components. The seating part 141 may include a seating part hole 141a provided at the center thereof to expose the central portion of the lens assembly 110 downward. The image sensor 152 may be disposed under the seating part hole 141a. The housing sidewalls 142 may be disposed while sharing each corner between edges of the seating part 141. The housing sidewalls 142 may include the first housing sidewall 142a disposed with the first coil 144a and the second coil 144b mutually operated with the first magnetic member 135a and the second magnetic member 135b disposed in the first carrier 132 such that the lens assembly 110 moves in the X-axis direction, a second housing sidewall 142b disposed with a third coil 144c and a fourth coil 144d mutually operated with the third magnetic member 135c and the fourth magnetic member 135d disposed in the first carrier 132 such that the lens assembly 110 moves in the Y-axis direction, a third housing sidewall 142c disposed with the AF coil 145 mutually operated with the AF magnetic member 136 disposed such that the lens assembly 110 moves in the Z-axis direction, and a fourth housing sidewall 142d.

An AF yoke 148 may be disposed on a side surface of the third housing sidewall 142c to dispose the AF coil 145. The AF coil 145 may be interposed between the AF magnetic member 136 and the AF yoke 148. The AF yoke 148 may improve the efficiency of the AF coil 145 by concentrating electromagnetic force between the AF magnetic member 136 and the AF coil 145. In addition, the second carrier 134 may make close contact with the third housing sidewall 142c by the attraction between the AF magnetic member 136 and the AF yoke 148. Accordingly, the AF guide balls 137c are prevented from deviating from the AF guide grooves 134f, and the second carrier 134 may reciprocate in the Z-axis direction.

The housing sidewalls 142 may be coupled to the shield can sidewalls 122 to protect the above-described components associated with the camera module therein. The first position sensor 146a, the second position sensor 146b, and the AF position sensor 147 (e.g., Hall sensor) may be disposed on the housing sidewalls 142. The first position sensor 146a may collect sensor information generated depending on the X-axis movement of the lens assembly 110 (or the first carrier 132). The second position sensor 146b may collect sensor information generated depending on the Y-axis movement of the lens assembly 110 (or the first carrier 132). The AF position sensor 147 may collect sensor information generated depending on the Z-axis movement of the lens assembly 110 (or the second carrier 134). The first position sensor 146a, the second position sensor 146b, and the AF position sensor 147 are electrically connected to a PCB 143 (e.g., a flexible PCB (FPCB)), and the collected sensor information may be transmitted to a first processor (e.g., a control circuit) of the camera module 10 or a second processor of an electronic device through the PCB 143. The first processor may be connected to a sensor board 151.

The PCB 143 may supply a signal (e.g., a current) to the coils 144a, 144b, 144c, 144d, and 145 disposed in the housing assembly 140. The PCB 143 may be connected to a first processor (or a control circuit) related to driving of the camera module 10 or a second processor of an electronic device on which the camera module 10 is mounted. The PCB 143 may supply a signal (e.g., a current of a specified intensity) of a specified intensity to at least one of the coils 144a, 144b, 144c, 144d, and 145 included in the housing assembly 140, under the control of at least one of the first processor and the second processor. The PCB 143 may receive a sensing value from each of the position sensors 146a, 146b, and 147 disposed in the housing assembly 140, and transmit a corresponding signal to each of the coils 144a, 144b, 144c, 144d, and 145.

The camera module 10 may include the image sensor 152 (e.g., a memory device) to collect an image. The image sensor 152 may be disposed to face the lens 111 through the seating part hole 141a disposed in at the lower portion of the housing assembly 140. The image sensor 152 may be disposed on the sensor board 151.

Figure 5:
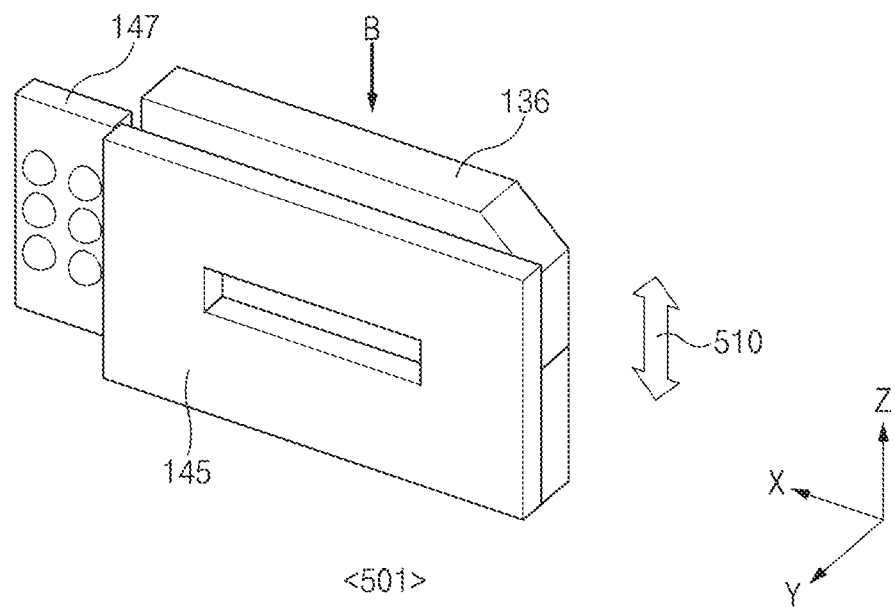
FIG. 5 is a view illustrating an AF magnetic member and an AF coil of a camera module, according to an embodiment.
Figure 5:
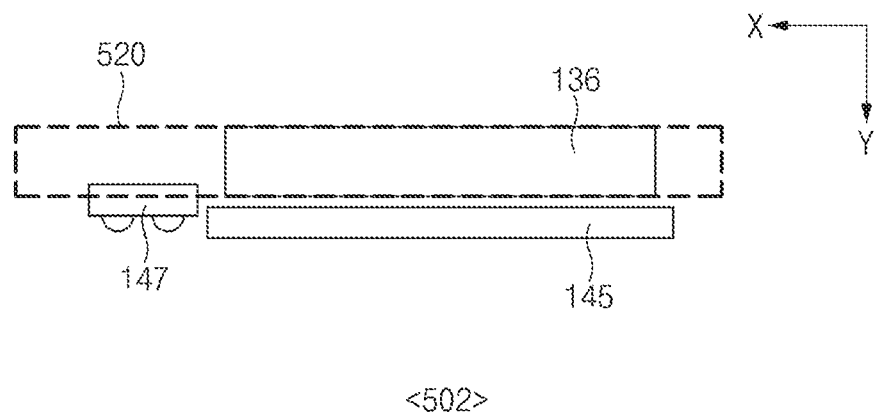

FIG. 5 is a view illustrating an AF magnetic member and an AF coil of a camera module, according to an embodiment.

FIG. 5 shows a perspective view 501 illustrating position relationships among the AF magnetic member 136, the AF coil 145, and the AF position sensor 147 of the camera module (e.g., the camera module 10), and a plan view 502 illustrating the AF magnetic member 136, the AF coil 145, and the AF position sensor 147 of reference numeral 501 when viewed in the direction of 'B'.

The AF magnetic member 136 may perform a first reciprocating movement 510 in a direction of one axis (e.g., the Z axis). The processor (e.g., the first processor (or the control circuit) associated with the driving of the camera module 10 or the second processor of the electronic device on which the camera module 10 is seated) may supply a signal (e.g., a current having a specified intensity) having a specified intensity to the AF coil 145. The processor may receive a sensing value from the AF position sensor 147 and supply a corresponding signal to the AF coil 145. The AF coil 145 may generate a magnetic field having a specified direction and a specified intensity depending on the received signal, and the AF magnetic member 136 may perform the first reciprocating movement 510 depending on the generated magnetic field.

The AF position sensor 147 may be disposed at one side (e.g., one side in the X-axis direction) of the AF coil 145 when viewed in the direction of 'B'. In addition, the AF position sensor 147 may be disposed on one side of the AF magnetic member 136 (e.g., one side in the X-axis direction). The AF coil 145 and the AF magnet magnetic 136 may be overlapped with each other when viewed in the Y-axis direction (or may be disposed while facing each other). When it is assumed that there is present a virtual expansion area 520 of the AF magnetic member 136 in the X-axis direction (the direction of uniformly maintaining spacing from the AF coil 145), at least a portion of the AF position sensor 147 may be overlapped with the virtual expansion area 520. Alternatively, at least a portion of the AF position sensor 147 may be overlapped with the AF magnetic member 136 when viewed in the X-axis direction.

Figure 6:
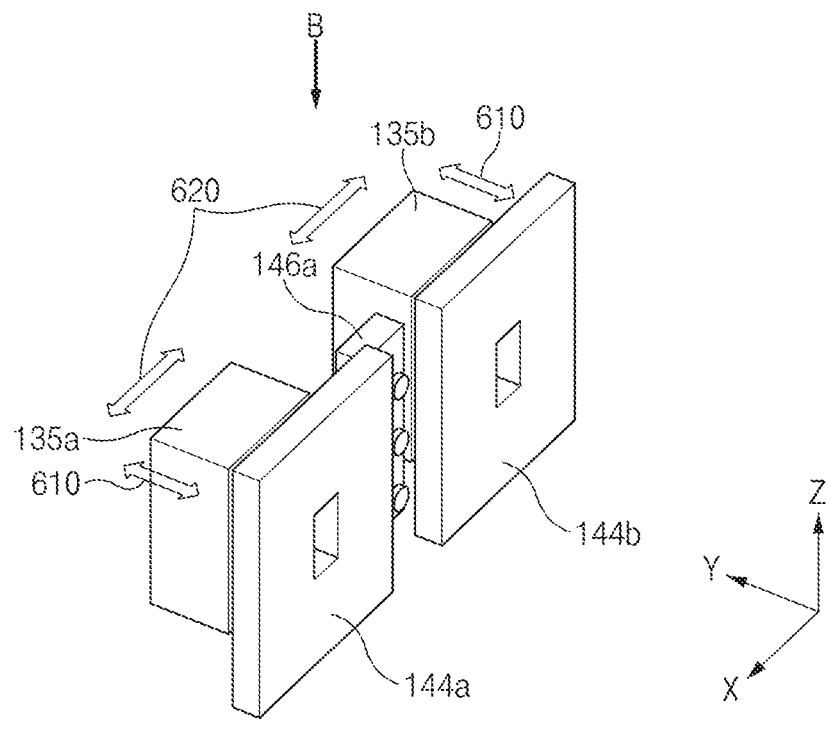
FIG. 6 is a view illustrating a first magnetic member, a second magnetic member, a first coil, and a second coil of a camera module, according to an embodiment.
Figure 6:
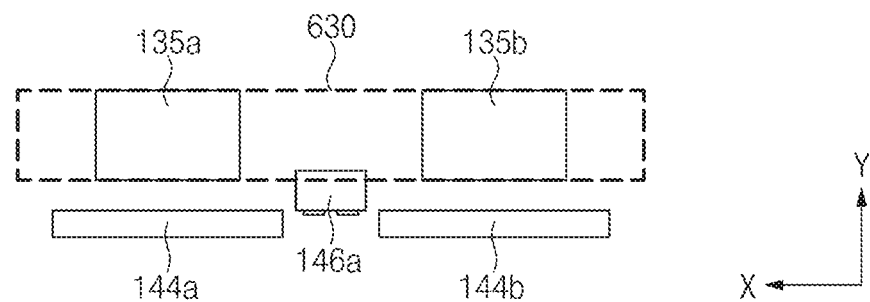

FIG. 6 is a view illustrating a first magnetic member, a second magnetic member, a first coil, and a second coil of a camera module, according to an embodiment.

FIG. 6 shows a perspective view 601 illustrating position relationships among the first magnetic member 135a, the second magnetic member 135b, the first coil 144a, the second coil 144b, and the first position sensor 146a of the camera module 10, and a plan view 602 illustrating the first magnetic member 135a, the second magnetic member 135b, the first coil 144a, the second coil 144b, and the first position sensor 146a of reference numeral 601 when viewed in the direction of 'B'.

The first magnetic member 135a and the second magnetic member 135b may perform a second reciprocating movement 610 and a third reciprocating movement 620 in the two axis directions (e.g., the X axis and the Y axis). The processor (e.g., the first processor (or the control circuit) associated with the driving of the camera module 10 or the second processor of the electronic device on which the camera module 10 is seated) may supply a signal (e.g., a current having a specified intensity) having a specified intensity to the first coil 144a and the second coil 144b. The processor may receive a sensing value from the first position sensor 146a and supply a corresponding signal to the first coil 144a and the second coil 144b. The first coil 144a and the second coil 144b may generate a magnetic field having a specified direction and a specified intensity depending on the received signal, and the first magnetic member 135a and the second magnetic member 135b may perform the second reciprocating movement 610 depending on the generated magnetic field.

In addition, referring to FIGS. 1 to 4, the third magnetic member 135c and the fourth magnetic member 135d may perform the third reciprocating movement 620 similarly to the first magnetic member 135a and the second magnetic member 135b. The processor may supply a signal having a specified intensity to the third coil 144c and the fourth coil 144d, the third coil 144c and the fourth coil 144d may generate a magnetic field having a specified direction and a specified intensity depending on the received signal, and the third magnetic member 135c and the fourth magnetic member 135d may perform the third reciprocating movement 620 depending on the generated magnetic field. When the first magnetic member 135a, the second magnetic member 135b, the third magnetic member 135c, and the fourth magnetic member 135d are fixed to the first carrier 132, and, the first magnetic member 135a and the second magnetic member 135b may perform the third reciprocating movement 620 through the first carrier 132 when the third magnetic member 135c and the fourth magnetic member 135d perform the third reciprocating movement 620. Accordingly, the first magnetic member 135a and the second magnetic member 135b may perform the second reciprocating movement 610 (e.g., the reciprocating movement by the first magnetic member 135a and the second magnetic member 135b) in the Y-axis direction, and perform the third reciprocating movement 620 (e.g., the third magnetic member 135c and the fourth magnetic member 135d) in the X-axis direction. Similarly, the third magnetic member 135c and the fourth magnetic member 135d may perform the second reciprocating movement 610 in the Y-axis direction and may perform the third reciprocating movement 620 in the X-axis direction.

The first position sensor 146a may be interposed between the first magnetic member 135a and the second magnetic member 135b when viewed in the direction of 'B'. In addition, the first position sensor 146a may be interposed between the first coil 144a and the second coil 144b. The first magnetic member 135a and the first coil 144a may be overlapped with each other when viewed in the Y-axis direction. The second magnetic member 135b and the second coil 144b may be overlapped with each other when viewed in the Y-axis direction. When it is assumed that there is present a virtual expansion area 630 of the first magnetic member 135a or the second magnetic member 135b in the X-axis direction (e.g., the direction that uniformly maintains specific spacing from the first magnetic member 135a or the second magnetic member 135b), at least a portion of the first position sensor 146a may be overlapped with the virtual expansion area 630. Alternatively, the at least a portion of the first position sensor 146a may be overlapped with the first magnetic member 135a or the second magnetic member 135b when viewed in the X-axis direction. Similarly, the second position sensor 146b may be interposed between the third magnetic member 135c and the fourth magnetic member 135d. In addition, the second position sensor 146b may be interposed between the third coil 144c and the fourth coil 144d. The third magnetic member 135c and the third coil 144c may be overlapped with each other when viewed in the X-axis direction. The fourth magnetic member 135d and the fourth coil 144d may be overlapped with each other when viewed in the X-axis direction. When it is assumed that there is present a virtual expansion area of the third magnetic member 135c or the fourth magnetic member 135d in the Y-axis direction (e.g., the direction that uniformly maintains specific spacing from the third magnetic member 135c or the fourth magnetic member 135d), at least a portion of the second position sensor 146b may be overlapped with the virtual expansion area. Alternatively, the at least a portion of the second position sensor 146b may be overlapped with the third magnetic member 135c or the fourth magnetic member 135d when viewed in the Y-axis direction.

Figure 7:
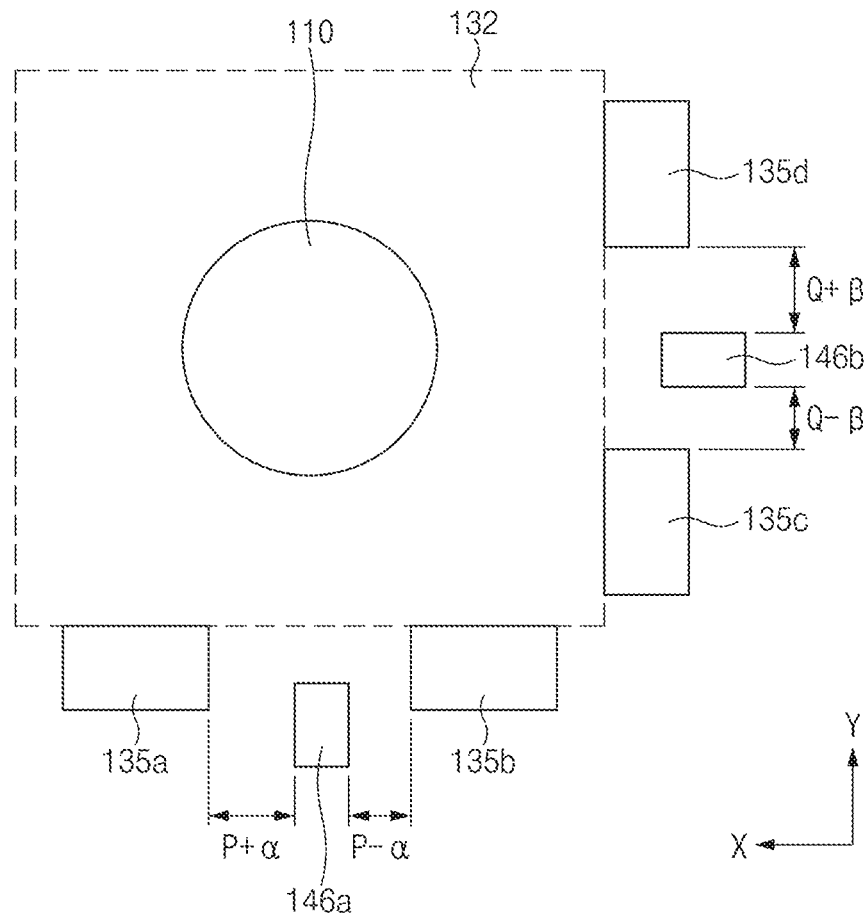
FIG. 7 is a view illustrating a method for correcting an assembling error of a first position sensor or a second position sensor of a camera module, according to an embodiment.
Figure 8:
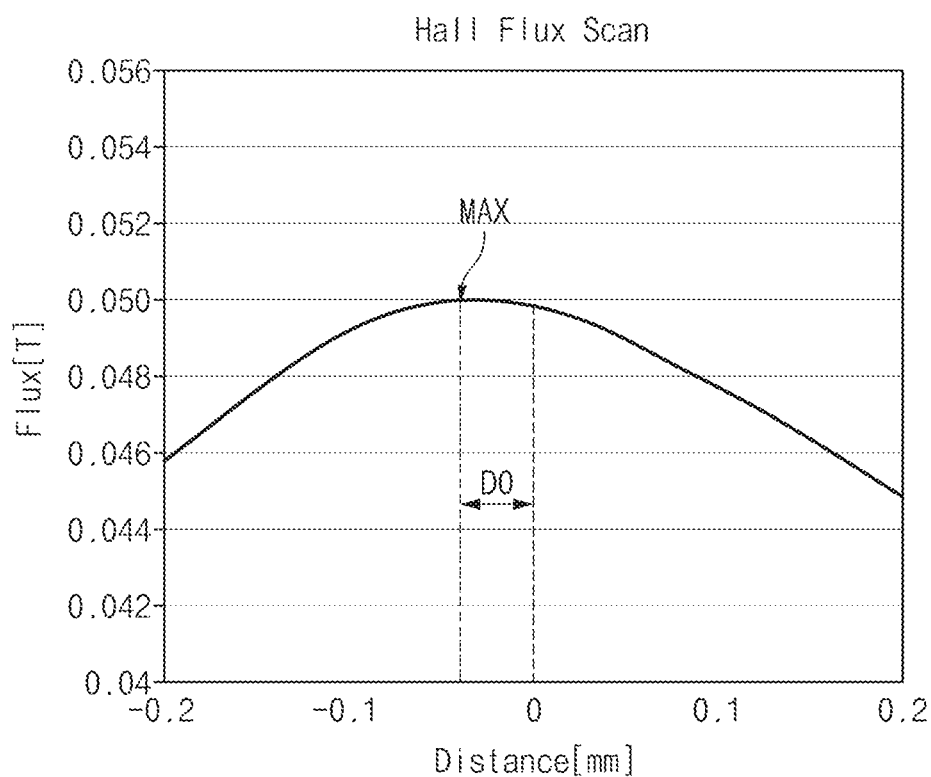
FIG. 8 is a graph illustrating the intensity, which is measured by the first position sensor or the second position sensor, of magnetic force.

FIG. 7 is a view illustrating a method for correcting an assembling error of a first position sensor or a second position sensor of a camera module, according to an embodiment. FIG. 8 is a graph illustrating the intensity, which is measured by the first position sensor or the second position sensor, of the magnetic force, according to an embodiment.

As the first position sensor 146a more exactly approaches an intermediate portion between the first magnetic member 135a and the second magnetic member 135b, the positions of the first magnetic member 135a and the second magnetic member 135b may be exactly measured. As the second position sensor 146b more exactly approaches an intermediate portion between the third magnetic member 135c and the fourth magnetic member 135d, the positions of the third magnetic member 135c and the fourth magnetic member 135d may be more exactly measured. However, in the assembling procedure, the first position sensor 146a may be disposed closer to one of the first magnetic member 135a or the second magnetic member 135b (e.g., an assembling error). Alternatively, the second position sensor 146b may be disposed closer to one of the third magnetic member 135c or the fourth magnetic member 135d (e.g., an assembling error). Accordingly, the assembling error of the first position sensor 146a or the second position sensor 146b may be needed to be corrected.

The first position sensor 146a may be disposed closer to the second magnetic member 135b instead of the first magnetic member 135a in the assembling procedure. The distance "P+α" between the first magnetic member 135a and the first position sensor 146a may be obtained through the sum of a first reference distance "P" and a first assembling error "α". The distance "P−α" between the second magnetic member 135b and the first position sensor 146a may be a distance obtained by subtracting the first assembling error "α" from the first reference distance "P". In this case, the first reference distance "P" may refer to a half of the distance between the first magnetic member 135a and the second magnetic member 135b.

The second position sensor 146b may be disposed closer to the third magnetic member 135c instead of the fourth magnetic member 135d in the assembling procedure. The distance "Q−β" between the third magnetic member 135c and the second position sensor 146b may be a distance obtained by subtracting the second assembling error "β" from the second reference distance "Q". The distance "Q+β" between the fourth magnetic member 135d and the second position sensor 146b may be obtained through the sum of the second reference distance "Q" and the second assembling error "β". In this case, the second reference distance "Q" may refer to a half of the distance between the third magnetic member 135c and the fourth magnetic member 135d.

The processor (e.g., the first processor (or the control circuit) associated with the driving of the camera module 10 or the second processor of the electronic device on which the camera module 10 is seated) may move the first carrier 132 in the X-axis direction while restricting the movement of the first carrier 132 in the Y-axis direction, and measure (or scan) the intensity of the magnetic field formed by the first magnetic member 135a and the second magnetic member 135b through the first position sensor 146a. Alternatively, the processor may move the first carrier 132 in the Y-axis direction while restricting the movement of the first carrier 132 in the X-axis direction, and may measure (or scan) the intensity of the magnetic field formed by the third magnetic member 135c and the fourth magnetic member 135d through the second position sensor 146b. The intensity of the magnetic field measured by the first position sensor 146a or the second position sensor 146b may have the form as in the graph of FIG. 8. When the assembling error is absent, the intensity of the magnetic field may have the maximum value (MAX) at a point at which a distance becomes '0' (e.g., the first reference distance 'P' or the second reference distance 'Q') in the graph of FIG. 8. However, when the assembling error (e.g., the first assembling error 'α' or the second assembling error 'β') is present, a point, at which the intensity of the magnetic field becomes the MAX, may be at the left side or the right side of a point at which the distance becomes '0' in the graph of FIG. 8. The offset distance 'DO' between the point, at which the intensity of the magnetic field becomes the MAX, and the point, at which the distance becomes '0', may be the assembling error (e.g., the first assembling error 'α' or the second assembling error 'β'). The processor may store the offset distance 'DO', which corresponds to the first position sensor 146a or the second position sensor 146b, in a memory (e.g., a memory included in the first position sensor 146a or the second position sensor 146b, or a memory 930 to be described below) and compensate the offset distance 'D' when determining the positions of the first magnetic member 135a and the second magnetic member 135b, and the positions of the third magnetic member 135c and the fourth magnetic member 135d.

Figure 9:
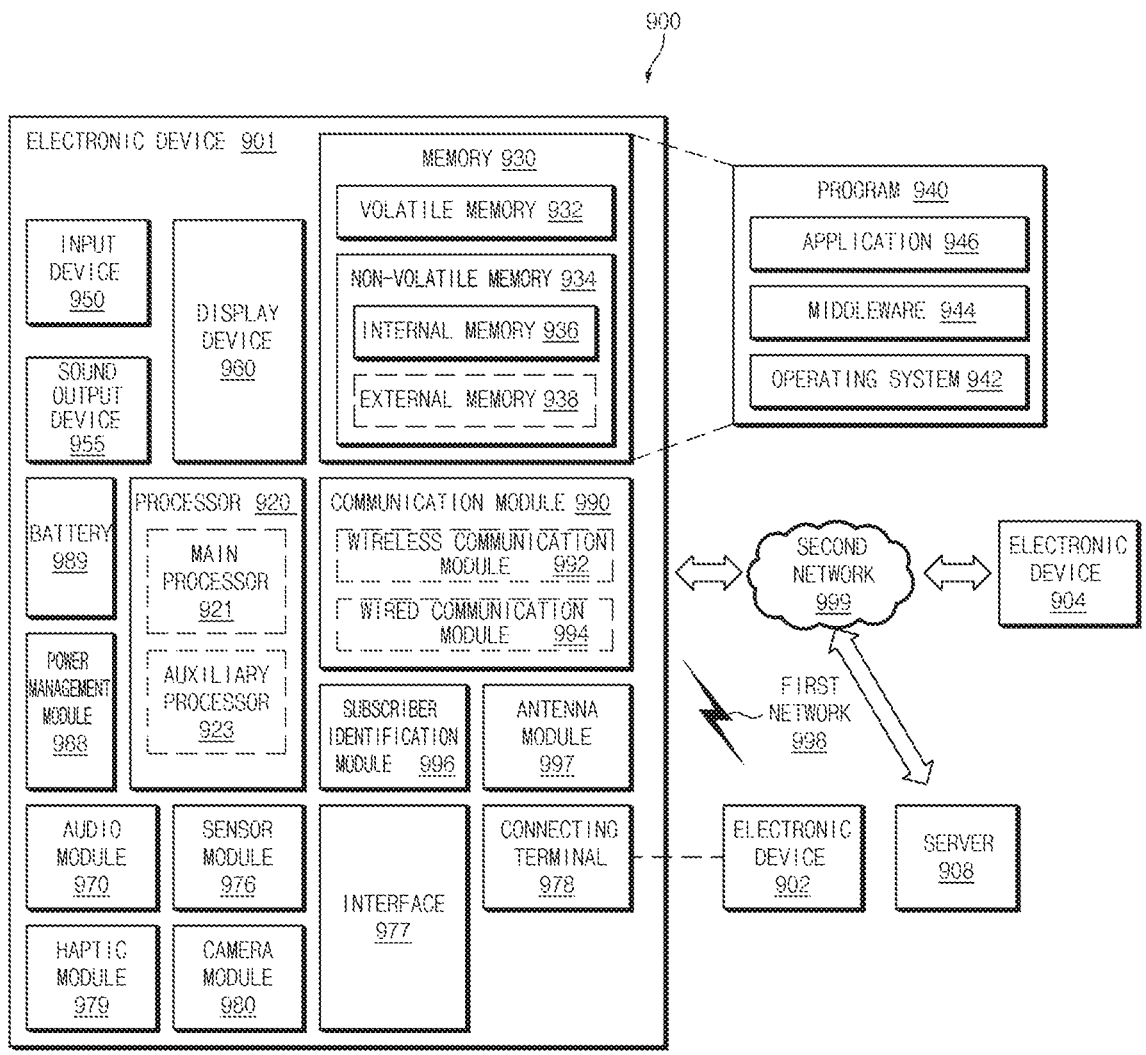
FIG. 9 is a block diagram illustrating an electronic device in a network environment, according to various embodiments.

FIG. 9 is a block diagram illustrating an electronic device 901 in a network environment 900 according to various embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an ISP or a CP) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, ISPs, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more CPs that are operable independently from the processor 920 (e.g., the AP) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMS)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., PCB). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed herein, the size of the camera module may be reduced.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A camera module comprising:
   a housing assembly;
   a driving assembly received in the housing assembly; and
   a lens assembly received in the driving assembly and including at least one lens aligned in a first direction,
   wherein the driving assembly includes a first magnetic member and a second magnetic member fixed to one side surface of the driving assembly and driven in a second direction perpendicular to the first direction,
   wherein the housing assembly includes:
      a first coil disposed to face the first magnetic member and configured to generate a magnetic field in response to a first signal to drive the first magnetic member;
      a second coil disposed to face the second magnetic member and configured to generate a magnetic field in response to a second signal to drive the second magnetic member; and
      a first position sensor interposed between the first coil and the second coil and configured to measure positions of the first magnetic member and the second magnetic member, and
   wherein the first position sensor is disposed to be partially overlapped with a first virtual expansion area formed by expanding the first magnetic member or the second magnetic member in a direction that uniformly maintains spacing from the first coil or the second coil.

2. The camera module of claim 1, wherein the driving assembly further includes:
   an AF magnetic member driven in the first direction;
   a first carrier to fix the AF magnetic member; and
   a second carrier received in the first carrier,
   wherein the second magnetic member and the first magnetic member are fixed to a first side surface of the second carrier,
   wherein the housing assembly further includes:
      an AF coil disposed to face the AF magnetic member and configured to generate a magnetic field in response to a third signal to drive the AF magnetic member; and
      an AF position sensor disposed at one side of the AF coil and configured to measure a position of the AF magnetic member, and
   wherein the AF position sensor is disposed to be partially overlapped with a second virtual expansion area formed by expanding the AF magnetic member in a direction that uniformly maintains spacing from the AF coil.

3. The camera module of claim 2, wherein the driving assembly further includes:
   a third magnetic member and a fourth magnetic member fixed on a second side surface of the second carrier and driven in a third direction perpendicular to the first direction and the second direction, the second side surface sharing one corner with the first side surface,
   wherein the housing assembly further includes:
      a third coil disposed to face the third magnetic member and configured to generate a magnetic field in response to a fourth signal to drive the third magnetic member;
      a fourth coil disposed to face the fourth magnetic member and configured to generate a magnetic field in response to a fifth signal to drive the fourth magnetic member; and
      a second position sensor interposed between the third coil and the fourth coil and configured to measure positions of the third magnetic member and the fourth magnetic member, and
   wherein the second position sensor is disposed to be partially overlapped with a third virtual expansion area formed by expanding the third magnetic member or the fourth magnetic member in a direction that uniformly maintains spacing from the third coil or the fourth coil.

4. The camera module of claim 3, wherein the AF magnetic member is disposed on one side surface of the first carrier that does not face the first side surface and the second side surface of the second carrier.

5. The camera module of claim 3, further comprising:
   a control circuit,
   wherein the AF position sensor is configured to measure an intensity of a first magnetic field from the AF magnetic member, and
   wherein the control circuit is configured to:
      determine the position of the AF magnetic member based on the intensity of the first magnetic field; and
      generate the third signal based on the position of the AF magnetic member.

6. The camera module of claim 5, wherein the first position sensor measures an intensity of a second magnetic field from the first magnetic member and the second magnetic member, and
   wherein the control circuit is further configured to:
      determine the positions of the first magnetic member and the second magnetic member on a straight line extending in the second direction, based on the intensity of the second magnetic field;
      generate the first signal based on the position of the first magnetic member; and
      generate the second signal based on the position of the second magnetic member.

7. The camera module of claim 6, wherein the second position sensor measures an intensity of a third magnetic field from the third magnetic member and the fourth magnetic member, and
   wherein the control circuit is further configured to:
      determine the positions of the third magnetic member and the fourth magnetic member on a straight line extending in the third direction, based on the intensity of the third magnetic field;
      generate the fourth signal based on the position of the third magnetic member; and
      generate the fifth signal based on the position of the fourth magnetic member.

8. The camera module of claim 7, wherein the control circuit is further configured to control:
   movement of the second carrier by a first section in the third direction without moving the second carrier in the second direction;
   measurement of the intensity of the second magnetic field through the first position sensor while the second carrier is moved by the first section; and
   setting of a position to maximize the intensity of the second magnetic field as a first reference position.

9. The camera module of claim 8, wherein the control circuit is further configured to control:
   movement of the second carrier by a second section in the second direction without moving the second carrier in the third direction;
   measurement of the intensity of the third magnetic field through the second position sensor while the second carrier is moved by the second section; and
   setting of a position to maximize the intensity of the third magnetic field as a second reference position.

10. The camera module of claim 9, further comprising:
    a memory;
    wherein the control circuit is further configured to control:
       storing, in the memory, a first offset distance between an intermediate point between the first magnetic member and the second magnetic member, and the first reference position, and
       storing, in the memory, a second offset distance between an intermediate point between the third magnetic member and the fourth magnetic member, and the second reference position.

11. The camera module of claim 7, wherein the control circuit is further configured to control:
    generation of the second signal identical to the first signal; and
    generation of the fourth signal identical to the fifth signal.

12. The camera module of claim 3, wherein a thickness of the AF coil is less than a thickness of the AF position sensor,
    wherein a thickness of the first coil and a thickness of the second coil are less than a thickness of the first position sensor, and
    wherein a thickness of the third coil and a thickness of the fourth coil are less than a thickness of the second position sensor.

13. The camera module of claim 3, wherein the first coil, the second coil, the third coil, the fourth coil, or the AF coil includes a fine pattern (FP) coil.

14. A camera module comprising:
    a housing assembly;
    a driving assembly received in the housing assembly; and
    a lens assembly received in the driving assembly and including at least one lens,
    wherein the driving assembly includes:
       a first magnetic member disposed on a first side surface of the driving assembly and configured to reciprocate in a first direction in which the at least one lens is aligned; and
       a second magnetic member and a third magnetic member disposed on a second side surface different from the first side surface of the driving assembly and configured to reciprocate in a second direction or a third direction perpendicular to the first direction,
    wherein the housing assembly includes:
       a first coil disposed to face the first magnetic member;
       a first position sensor disposed at one side of the first coil and configured to measure an intensity of a magnetic field corresponding to the first magnetic member;
       a second coil disposed to face the second magnetic member;
       a third coil disposed to face the third magnetic member; and
       a second position sensor interposed between the second coil and the third coil and configured to measure positions of the second magnetic member and the third magnetic member,
    wherein the first position sensor is disposed to be partially overlapped with a first virtual expansion area formed by expanding the first magnetic member in a direction that uniformly maintains spacing from the first coil, and
    wherein the second position sensor is disposed to be partially overlapped with a second virtual expansion area formed by expanding the second magnetic member or the third magnetic member in a direction that uniformly maintains spacing from the second coil or the third coil.

15. The camera module of claim 14, wherein the second magnetic member reciprocates in the second direction by a magnetic field generated by the second coil, and
    wherein the third magnetic member reciprocates in the second direction by a magnetic field generated by the third coil.

16. The camera module of claim 14, wherein the driving assembly further includes:
    a fourth magnetic member and a fifth magnetic member disposed on a third side surface which shares one corner with the second side surface of the driving assembly, and configured to reciprocate in the second direction or the third direction, wherein the housing assembly further includes:
    a fourth coil disposed to face the fourth magnetic member;
    a fifth coil disposed to face the fifth magnetic member; and
    a third position sensor interposed between the fourth coil and the fifth coil and configured to measure a magnetic field from the fourth magnetic member and the fifth magnetic member, and
    wherein the third position sensor is disposed to be partially overlapped with a third virtual expansion area formed by expanding the fourth magnetic member or the fifth magnetic member in a direction that uniformly maintains a specific spacing from the fourth coil or the fifth coil.

17. The camera module of claim 16, wherein the fourth magnetic member reciprocates in the third direction by a magnetic field generated by the fourth coil, and
    wherein the fifth magnetic member reciprocates in the third direction by a magnetic field generated by the fifth coil.

18. The camera module of claim 16, wherein the second magnetic member and the third magnetic member reciprocate in the third direction based on reciprocating movements of the fourth magnetic member and the fifth magnetic member, and wherein the fourth magnetic member and the fifth magnetic member reciprocate in the second direction based on reciprocating movements of the second magnetic member and the third magnetic member.

\* \* \* \* \*